No. 856,476. PATENTED JUNE 11, 1907.
G. LAIRD & J. P. TODD.
ELECTRICAL CONTROLLER.
APPLICATION FILED FEB. 4, 1905.

3 SHEETS—SHEET 1.

WITNESSES:
C. L. Belcher
Otto S. Schairer.

INVENTORS
George Laird
John P. Todd
BY
ATTORNEY

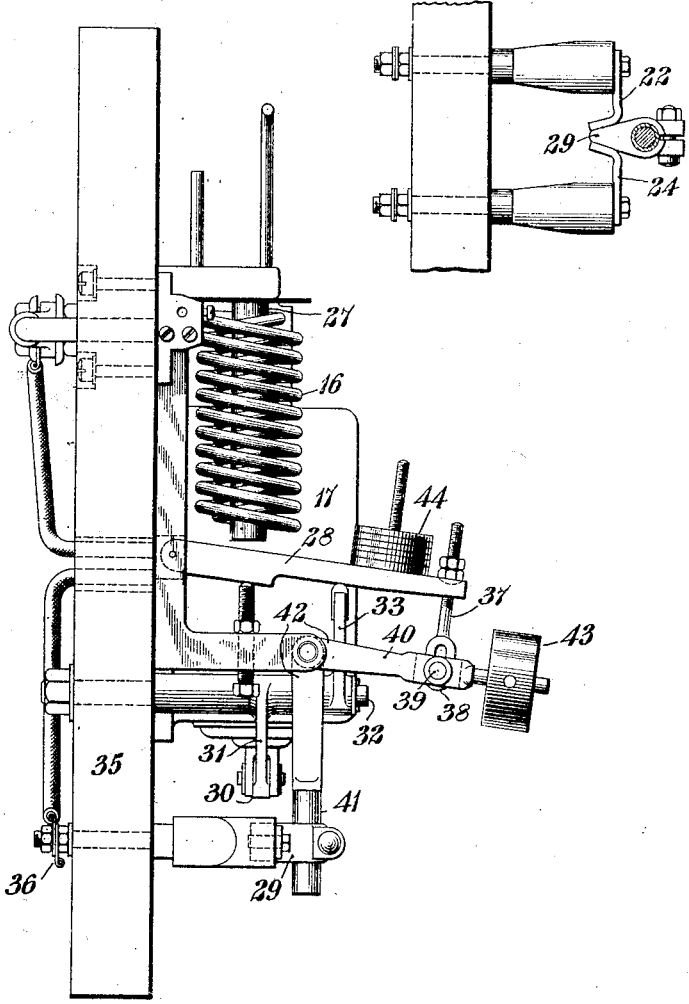

UNITED STATES PATENT OFFICE.

GEORGE LAIRD AND JOHN PERCIVAL TODD, OF MANCHESTER, ENGLAND, ASSIGNORS TO WESTINGHOUSE ELECTRIC & MANUFACTURING COMPANY, A CORPORATION OF PENNSYLVANIA.

ELECTRICAL CONTROLLER.

No. 856,476.         Specification of Letters Patent.         Patented June 11, 1907.

Application filed February 4, 1905. Serial No. 244,180.

*To all whom it may concern:*

Be it known that we, GEORGE LAIRD and JOHN PERCIVAL TODD, subjects of the King of Great Britain, and residents of Manchester, in the county of Lancaster, England, have invented a new and useful Improvement in Electrical Controllers, of which the following is a specification.

Our invention relates to controllers for electric motors or other apparatus, and it has for its object to provide an improved device for opening the main circuit either when the current exceeds a predetermined limit or when the voltage falls below a desired value.

Figure 1:
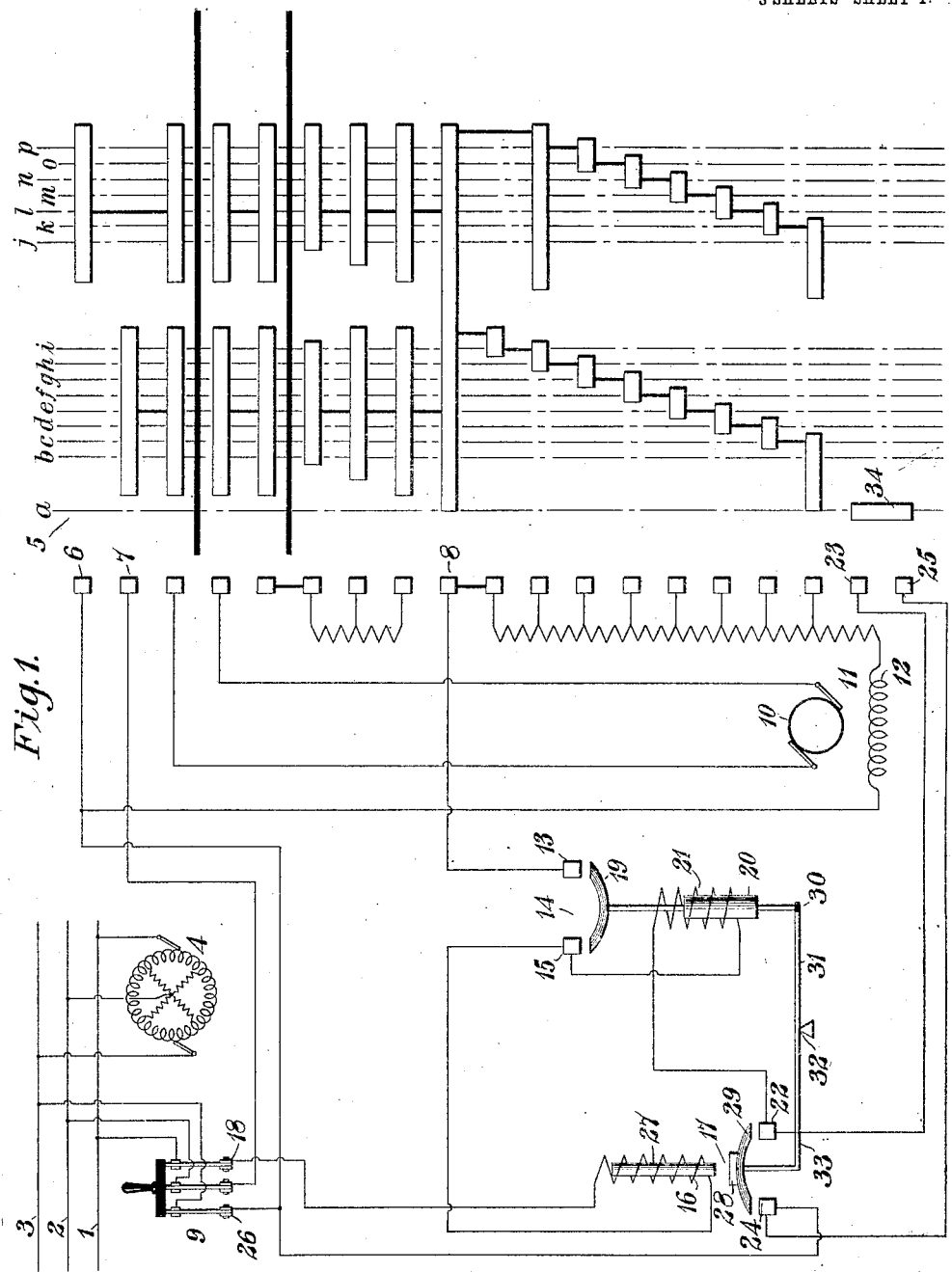
Figure 2:
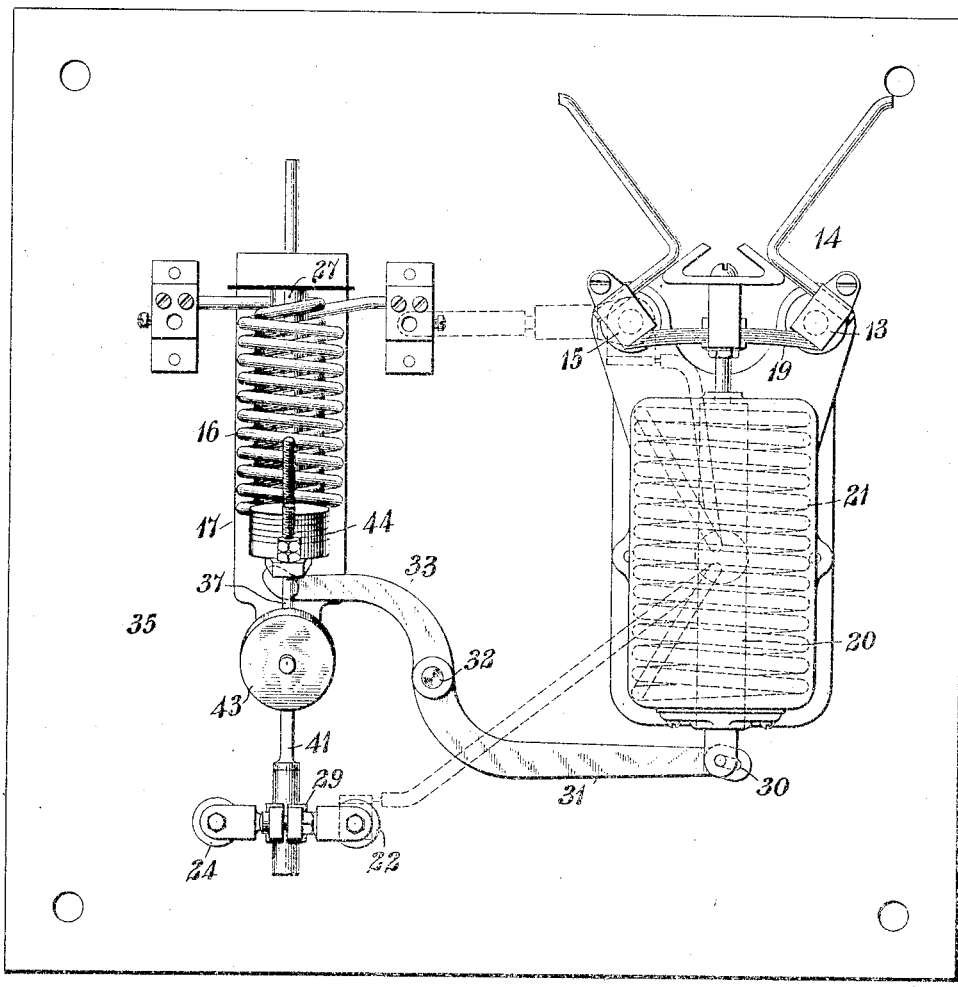

In the accompanying drawings, Figure 1 is a diagrammatic view of a system embodying our invention. Fig. 2 is a view in front elevation of a circuit breaking device such as may be employed in the system shown in Fig. 1. Fig. 3 is a view in side elevation of the circuit breaking device shown in Fig. 2, and Fig. 4 is a plan view of some of the details of the circuit breaking device shown in Figs. 2 and 3.

Energy is supplied to distributing conductors 1, 2 and 3 from any suitable source 4 of multivoltage energy, and circuit connections are made with a controller 5 through its stationary contact terminals 6, 7 and 8, a line switch 9 being provided for the purpose of making and breaking such circuit connections.

The controller 5 comprises the ordinary means for connecting the terminals of an armature winding 10 of a motor 11 to the source of multivoltage energy and for varying the resistance in the circuit of the field magnet winding 12 that is connected across one pair of the distributing conductors. Contact terminal 8 of the controller 5 is electrically connected to stationary terminal 13 of a circuit breaker 14, the other stationary terminal 15 of which is connected to one terminal of magnet winding 16 of a switch 17. The other terminal of winding 16 is connected to terminal 18 of line switch 9.

The movable contact terminal 19 of the circuit breaker 14 is attached to the core 20 of a solenoid 21, the respective terminals of which are connected to terminal 15 and stationary terminal 22 of the switch 17. Stationary terminal 22 is also connected to contact finger 23 of the controller 5. The other stationary terminal 24 of the switch 17 is connected to contact fingers 6 and 25 of controller 5 and to terminal 26 of line switch 9.

The switch 17 comprises, besides the operating magnet winding 16 and the stationary terminals 22 and 24, a magnetizable core 27, an armature 28 therefor and a contact terminal 29 which is adapted to engage the stationary terminals 22 and 24 and is raised out of engagement therewith when the core 27 is magnetized to such a degree as to raise its armature 28.

One end 30 of a lever 31 that is fulcrumed at 32 has a slot and pivot connection with the solenoid core 20 of the circuit breaker 14, and the other end 33 engages the armature 28 in such a manner that the switch 17 is opened when the circuit breaker 14 is opened, but may be opened independently thereof and may be closed either when the circuit breaker 14 is closed or independently after it has been closed.

The coil 21 raises the core 20 and causes the movable terminal 19 to engage stationary terminals 18 and 15, when the voltage applied to the motor exceeds a predetermined limiting value, and when the end 33 of the lever 31 is lowered, the member 29 of the switch 17 is permitted to engage stationary terminals 22 and 24.

If the voltage applied to the motor falls below a predetermined value, the core 20 is released and movable terminal 19 is disengaged from stationary terminals 13 and 15, and movable terminal 29 of the switch 17 is disengaged from terminals 22 and 24 of that circuit breaker. If the current delivered to the motor exceeds a predetermined limiting value, armature 28 and member 29 are raised and the circuit of the coil 21 is interrupted.

If the line switch 9 is closed and the controller 5 occupies position *a*, the drum segment 34 connects contact fingers 23 and 25, and a circuit is thus established from distributing conductor 1 through line switch 9, magnet winding 16 of switch 17, coil 21 of circuit breaker 14, stationary terminal 22, contact finger 23, drum segment 34, contact finger 25, stationary terminal 24, line switch 9 and distributing conductor 3. The coil 21, being thus energized, closes the circuit breaker 14 and the switch 17 is also released and allowed to close. As soon as the switch 17 is closed, the circuit of the coil 21 is completed through the circuit breaker 14, and then if the controller 5 is moved to its succeeding positions, current will be supplied to the motor 11.

The controller 5 being of the ordinary type which is employed for the purpose of controlling the circuits of electric motors adapted to be supplied with energy from a multivoltage source, it is deemed unnecessary to further describe the circuits in detail. It may be stated, however, that in the first series of positions of the controller the armature winding is connected to the low voltage distributing conductors and the strength of the field is gradually reduced. In the succeeding positions of the controller, the armature winding is connected to the high voltage distributing conductors and the resistance is first included in the circuit of the field magnet winding and is then gradually cut out.

It is to be noted that drum segment 34 engages contact fingers 23 and 25 only when the controller is in its first position. As before explained, if the voltage applied to the motor 11 falls below a predetermined limiting value, the circuit breaker 14 and the switch 17 open and the coil 21 cannot be again energized for the purpose of operating these devices, until the controller is returned to its first position so that drum segment 34 may engage contact fingers 23 and 25. A similar operation becomes necessary if the current supplied to the motor exceeds a predetermined limiting value, since the switch 17 will first open, thereby interrupting the circuit of the coil 21 and allowing the circuit breaker 14 to open.

The circuit breaking devices which I have described in the foregoing part of the specification are shown in Figs. 2, 3 and 4. Terminals 13, 15, 22 and 24, and magnet windings 16 and 21 may be mounted upon a suitable insulating slab 35, the terminals being provided with any suitable means, such as those shown at 36, for making circuit connections thereto. The armature 28 carries at its outer end a bolt 37 having a slotted head 38 through which a pin 39 projects. The pin 39 is mounted near the outer end of one arm 40 of a bellcrank lever 42, the other arm 41 of which is provided with a wedge-shaped terminal piece 29 which is adapted to engage and electrically connect terminals 22 and 24. Means for normally maintaining the switch 17 in its closed position comprises a weight 43 that is carried at the outer end of the bellcrank lever arm 40 and is adjustable in position thereon. The armature 28 may be adapted to move under the action of different magneto-motive forces, by loading it with a greater or less number of weights 44.

The mechanical details of the apparatus which may be employed for securing the results that we have hereinbefore set forth may be largely varied within the scope of our invention, and we therefore desire to cover and include all variations that do not impart material changes in operation or result.

We claim as our invention:

1. The combination with a source of electrical energy, a translating device and a circuit controller therefor, of a circuit-breaking means comprising a main switch, an actuating coil therefor, an auxiliary switch in the circuit of said coil, an actuating coil for said auxiliary switch that is in circuit with the main switch, and a third switch that is mechanically operated by the circuit controller to close the circuit of the actuating coil of the main switch only when the circuit controller is in its initial position.

2. The combination with a source of electrical energy, a translating device and a circuit controller therefor, of a circuit breaking means comprising a main switch, an actuating coil therefor, an auxiliary switch in the circuit of said coil, an actuating coil for said auxiliary switch that is in circuit with the main switch, and a governing switch for the circuit of the main switch actuating coil, said governing switch constituting part of the circuit controller and being closed only when said controller is in its initial position.

3. The combination with a source of electrical energy, a translating device and a circuit controller therefor, of a circuit breaking device comprising a main circuit switch, an operating coil therefor, an auxiliary switch in the circuit thereof, an operating coil therefor which is in circuit with the main switch, means connecting the two switches that causes the auxiliary switch to open when the main switch is opened and which also permits the auxiliary switch to open independently of the main switch, and a manually operated switch in the circuit of the operating coil of the main switch.

4. The combination with a source of electrical energy and a translating device, of a main switch that is normally closed and is opened when the voltage applied to the translating device falls below a predetermined limiting value, and an auxiliary switch which is interlocked with the main switch to be opened thereby and is independently opened when the current traversing the circuit exceeds a predetermined limiting value.

5. The combination with a source of electrical energy and a translating device, of a main switch that is normally closed and is opened when the voltage applied to the translating device falls below a predetermined limiting value, an auxiliary switch which is interlocked with the main switch to be opened thereby and is independently opened when the current traversing the circuit exceeds a predetermined limiting value, and a manually-operated switch which controls the operation of the main switch.

6. The combination with a source of electrical energy and a translating device, of a main circuit switch, an auxiliary circuit switch and means for causing the two switches to open when the voltage applied to the translating device falls below a predetermined limiting value.

7. The combination with a source of electrical energy and a translating device, of a main switch having an actuating coil, an auxiliary switch, a coil and mechanism under the influence thereof for opening the auxiliary switch when the current in the main circuit exceeds a predetermined limiting value, and mechanism between the two switches that opens the auxiliary switch when the main switch opens and permits the former to open independently of the latter.

8. The combination with a source of electrical energy, a translating device and a circuit controller therefor, of an electro-magnetically-actuated switch that is normally closed and is opened when the voltage applied to the translating device falls below a predetermined limiting value, an auxiliary switch that is mechanically interlocked with the main switch to be actuated thereby but is independently opened when the current traversing the main circuit exceeds a predetermined limiting value, and a third switch that is operated by the controller and serves to effect closure of the main switch only when the controller occupies its first position.

9. The combination with a source of electrical energy, a translating device and a circuit controller therefor, of a main switch that is normally closed and is opened when the voltage applied to the translating device falls below a predetermined limiting value, an auxiliary switch that is opened by the opening of the main switch and is independently opened when the current traversing the main circuit exceeds a predetermined limiting value, and a switch that is opened and closed by the controller to control the operation of the main switch.

10. The combination with a source of electrical energy, a translating device and a circuit controller therefor, of a main circuit switch that is normally closed and is opened when the voltage applied to the translating device falls below a predetermined limiting value, an auxiliary switch which is normally closed and is opened when the current traversing the main circuit exceeds a predetermined limiting value, and means for preventing closure of the said switches except when the controller occupies its first position.

In testimony whereof, we have hereunto subscribed our names these 14th and 19th days of January, 1905.

GEORGE LAIRD.
JOHN PERCIVAL TODD.

Witnesses:
ROBERT LOVE,
ANDREW K. LINDSAY.

Witnesses to the signature of John Percival Todd:
JNO. R. THORNHILL,
JAS. STEWART BROADFOOT.